United States Patent [19]

Hannan

[11] Patent Number: 4,506,303

[45] Date of Patent: Mar. 19, 1985

[54] OPTICAL DATA RECORDER SYSTEM

[75] Inventor: William J. Hannan, Concord, Mass.

[73] Assignee: Itek Corporation, Lexington, Mass.

[21] Appl. No.: 423,482

[22] Filed: Sep. 24, 1982

[51] Int. Cl.³ .......................... H04N 3/14; H04N 1/22
[52] U.S. Cl. .................................... 358/302; 358/213; 346/108
[58] Field of Search ................. 346/108, 1.1; 358/293, 358/294, 296, 213, 302

[56] References Cited

U.S. PATENT DOCUMENTS

| | | | |
|---|---|---|---|
| 4,259,693 | 3/1981 | Aaron et al. | 358/261 |
| 4,314,261 | 2/1982 | Martinage | 346/108 |
| 4,356,513 | 10/1982 | Yoshimura et al. | 358/213 |
| 4,376,933 | 3/1983 | Saran et al. | 340/347 DD X |

Primary Examiner—E. A. Goldberg
Assistant Examiner—Gerald E. Preston
Attorney, Agent, or Firm—Homer O. Blair; Michael H. Wallach

[57] ABSTRACT

An optical data recording system and method for receiving an input data stream to be recorded on a recording medium; dividing the input data stream into a series of data sections; compressing each data section in the series into a period shorter than the period of the original section and providing data gaps between each compressed data section; recombining the compressed data sections including the data gaps into a gapped output data stream; and recording the gapped output data stream on a recording medium.

34 Claims, 8 Drawing Figures

OPTICAL DATA RECORDER SYSTEM

FIELD OF INVENTION

This invention relates to a data recorder system and method which sections and compresses an input data stream and provides an intermittent space or gap between each compressed data section. More particularly, the invention relates to such a method and system in which the data gaps are aligned with the corresponding nonconformities of a discontinuous reader device.

BACKGROUND OF INVENTION

The nature of the manufacturing process of charge coupled devices (CCDs) has limited the length of such devices to 2,048 pixel sites. Applications requiring the use of longer CCDs have typically employed two or more such CCDs which are staggered or arranged with some overlap. An inherent problem in the use of staggered, overlapping CCDs is the inaccuracy and unreliability of one or more (typically two to four) pixel sites at the junction of the overlapping CCDs. This causes a loss of information and/or a streaking of optical images.

Recently a technique has been developed to butt-join two or more CCDs on a hybrid substrate in order to accommodate applications requiring CCD arrays in excess of 2,048 pixel sites. See "10,240 Pixel Focal Plane With Five Butted 2,048×96 Element TDI CCDs", by W. C. Bradley and A. A. Ibrahim, from Proceedings of the Society of Photo-Optical Instrumentation Engineers, Vol. 175, "Airborne Reconnaissance IV", Apr. 17-18, 1979, pp. 72-80. This procedure enables the construction of linear CCD arrays of unlimited length. The butting procedure allows for a more uniform arrangement of two or more CCDs but suffers a loss of several pixel sites at each butt joint (typically two or more from each adjacent CCD at each joint). This inherent loss of pixel sites at the butt joints results from the inability to perfectly align and finish the ends of CCD semiconductor chips.

In optical imaging applications, a loss of four pixels for every 2048 pixel sites is well within the tolerable limits, resulting only in minor streaking which can be eliminated by well-known signal processing techniques. It is therefore not an insurmountable problem in such applications.

As a result of the extremely high resolution and data rates that are obtainable with the use of CCDs, these devices have become particularly desirable in data processing applications. These applications, however, demand much higher accuracy and reliability and usually have error factor tolerances of less than $10^{-6}$. This limitation has prevented the use of CCDs in data processing applications requiring more than 2,048 pixel sites in a single array because of the inherent unreliability that occurs at the junctions of a hybrid CCD substrate. In other words, since most data playback applications call for a probability of error on the order of $10^{-6}$ or better, a loss of two or more pixels per thousand pixels cannot be tolerated.

SUMMARY OF INVENTION

It is therefore an object of this invention to provide an improved data recorder system which records a data stream in a series of sections with inserted gaps while maintaining accurate data retention.

It is a further object of this invention to provide such a system which records data for reading by a discontinuous reader device.

It is a further object of this invention to provide such a system which enables the use of butted or staggered CCD arrays, in the form of a discontinuous reader device, while maintaining accurate retention of data.

It is a further object of this invention to provide such a system which produces an output which is compatible with the use of hybrid CCD substrates and other discontinuous reader devices.

The invention results from the realization that discontinuous reader devices can be employed in a recorder system regardless of the inherent unreliability of several pixel sites at or near the nonconforming junctions of such reader devices, by sectioning, compressing and reassembling the input data stream into an output data stream, including gaps between each compressed section of data which are deliberately aligned with the nonconformities of the discontinuous reader device in order to avoid a loss of data as a result of these nonconformities.

This invention features an optical data recorder system including reception means for receiving an input data stream to be recorded on a recording medium. Means responsive to the reception means divides the input data stream into a series of data sections. There are means for compressing each data section in the series into a period shorter than the period of the original section and for providing data gaps between each compressed data section. Means for recombining the compressed data sections assembles the data and gaps into a gapped output data stream, and there are means for recording the gapped output data stream on a recording medium.

In a preferred embodiment the means for recording may include an optical recorder, and the optical recorder may include a laser device. The recording medium may be adapted to be read by a discontinuous reader device and the means for receiving may include synchronizing means for operating the means for dividing, the means for compressing, and the means for recombining to synchronously section, compress and recombine the input data stream in order to deliberately align the gaps with the discontinuities in the reader device. The discontinuous reader device may include a hybrid butted or staggered CCD array. The means for dividing may include first and second register means and first register switching means for alternately loading each register with sections of the data stream. The means for recombining may include second register switching means for alternately unloading each register to reform the data stream. The means for compressing may include first clock means having a first rate and second clock means having a higher clock rate than the first clock rate, and clock switching means for alternately interconnecting each of the clock means to each of the register means. The second clock means may include a dwell or blanking period to provide a "stop" or "pause" function in order to produce the appropriate gap between each data section. A series of coded or special bits may be included in the data stream to signify the commencement and termination of either the data sections or of the gaps between each section. The data compression may be increased, thereby increasing the data gap, in order to provide additional available pixel sites to detect these coded bits.

The invention also features a method of recording optical data by receiving an input data stream to be recorded on a recording medium and dividing the input data stream into a series of data sections. The method further includes compressing each data section in the series into a period shorter than the period of the original section and providing data gaps between each compressed data section, recombining the compressed data sections including the data gaps into a gapped output data stream, and recording the gapped output data stream on a recording medium.

DISCLOSURE OF PREFERRED EMBODIMENT

Other objects, features and advantages will occur from the following description of a preferred embodiment and the accompanying drawings, in which.

Figure 1:
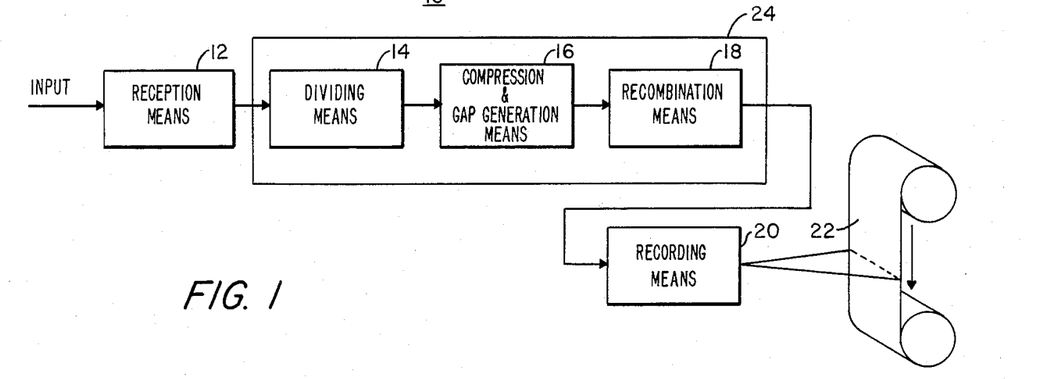
FIG. 1 is a simplified block diagram of a data recording system according to this invention, showing in detail the data rate conversion circuit.

There is shown in FIG. 1 a simplified block diagram of a data recorder system 10 according to this invention in which reception means 12 delivers a input stream of data to dividing means 14 in data rate conversion circuit 24, which sections or divides the input data stream into a series of data sections. Each data section is then compressed by compression and gap generation means 16 into a period less than that of the original data section, and gaps are inserted between each compressed section of data. Recombination means 18 reconstructs the compressed data sections and delivers the gapped output data stream to recording means 20. Recording means 20 records the gapped data stream on recording medium 22.

Figure 2:
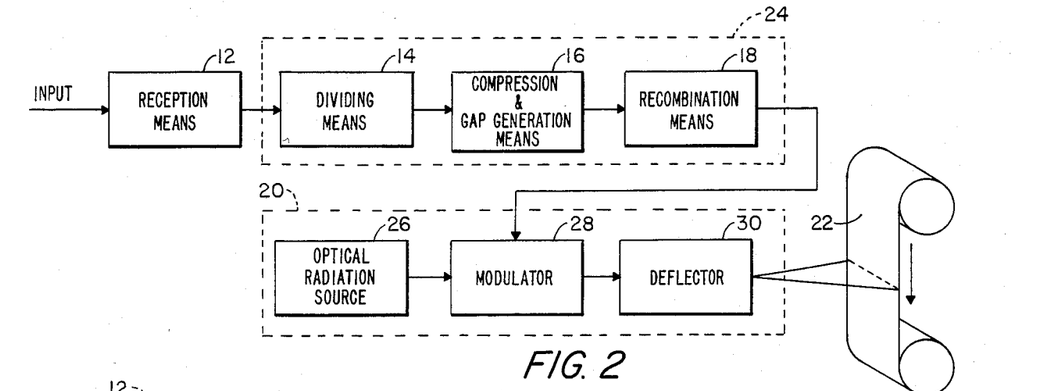
FIG. 2 is a more detailed block diagram of the system depicted in FIG. 1, showing the recording means in greater detail.

Recording means 20, FIG. 2, may include an optical radiation source 26 such as a laser, a modulator 28, controlled by the data rate conversion circuit 24, for altering the optical image delivered by radiation source 26, and a deflector 30 for exposing the modulated radiation source output upon recording medium 22.

Figure 3:
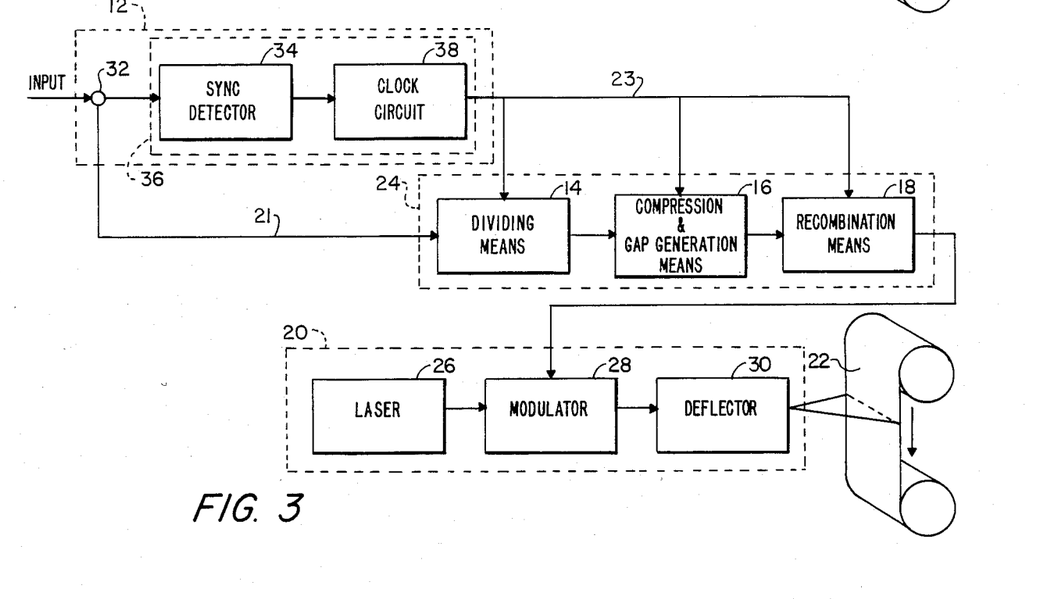
FIG. 3 is a more detailed block diagram of the system depicted in FIG. 2, showing the reception means in greater detail.

Reception means 12, FIG. 3, includes a terminal 32 which receives an input data stream and delivers it to data rate conversion circuit 24 and synchronous detector 34 in synchronizing means 36. Synchronous detector 34 delivers a synchronized signal to clock circuit 38, based upon the synchronizing pulse that accompanies the input data. Clock circuit 38 delivers a signal on line 23 to dividing means 14, compression and gap generation means 16 and recombination means 18 to activate the appropriate sectioning and reconstruction of the data stream. After the data stream has been sectioned, compressed, and recombined by data rate conversion circuit 24, it is directed to recording means 20 which records the gapped data stream on recording medium 22.

Figure 4:
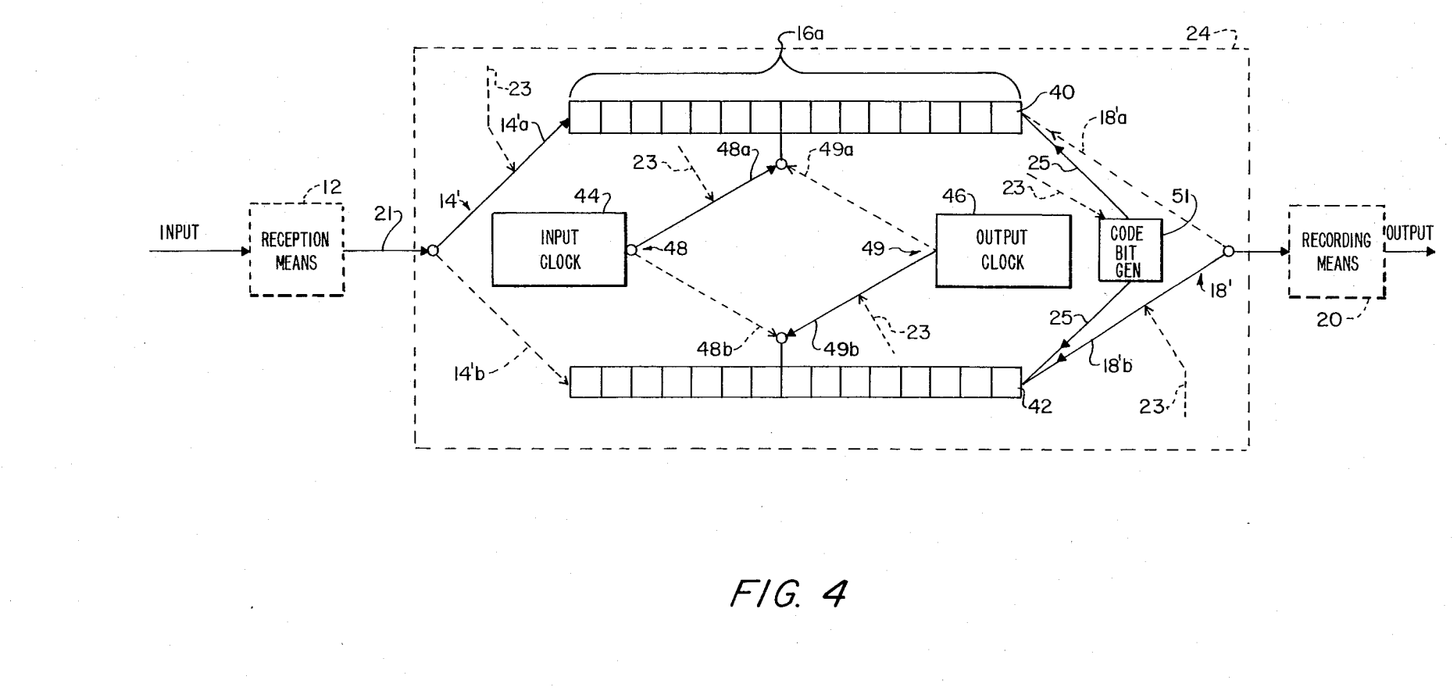
FIG. 4 is a more detailed diagram of the data rate conversion circuit utilized in the systems depicted in FIGS. 1, 2, and 3.

One embodiment of the data rate conversion circuit 24, FIGS. 1, 2, and 3, is shown in more detail in FIG. 4. Reception means 12 delivers an input data stream on line 21 to the dividing means in data rate conversion circuit 24. The dividing means may include switching means 14' having two alternate positions. One such position 14'a directs the input data stream to first register 40. The other position 14'b directs the input data stream to second register 42. By alternately loading the first and second registers 40 and 42, each for a specified time period, the input data stream is effectively separated into a number of equal sections. The input clock 44 controls the rate at which the sections are loaded into first and second registers 40 and 42.

The recombination means may include switching means 18' having two alternate positions. One such position 18'a reads out data from first register 40 while the other position 18'b reads out data from second register 42.

Output clock 46 unloads each section of data from the first and second registers 40 and 42 at a slightly faster rate than the rate at which the input data stream was fed into the registers. Output clock 46 includes a dwell or blanking period which is activated before or after the unloading of each data section from the first and second registers 40 and 42. This provides a "halt" or "pause" between each compressed data section in order to produce the appropriate data gaps. By alternately unloading first and second registers 40 and 42 at a slightly faster rate than that at which they were loaded, the data sections are effectively compressed and recombined into a continuous data stream. By providing a "pause" or "halt" period after the unloading of each data section from the first and second registers 40 and 42, an intermittent space or gap is effectively provided between each compressed section of data. The intermittent space or gap between each section of data can be aligned with the nonconformities of a discontinuous reader device in order to avoid data loss at the point of nonconformity, such as the joints of a butted CCD substrate. The reconstructed gapped output data stream is delivered from recombination switching means 18' to recording means 20 for subsequent processing as previously described.

The functions of sectioning, compression, gap insertion, and recombination of the data stream are synchronously controlled by clock circuit 38 in FIG. 3. The clock circuit signals on lines 23, FIG. 4 control the connection of one register 40 to dividing means 14' and input clock 44, while simultaneously connecting the other register 42 to recombination means 18' and output clock 46. This is accomplished by placing dividing switch means 14' in position 14'a, input clock switch means 48 in position 48a, recombination switch means 18' in position 18'b and output clock switch means in position 49b. This enables the loading of a particular data section into first register 40 at a fixed rate (determined by input clock 44) while the preceding data section is unloaded from second register 42 at a slightly higher rate (determined by output clock 46). In the next stage of operation the clock circuit signals on lines 23 reverse the positioning of each of the switching means to place the dividing switch means 14' in position 14'b, input clock switch means 48 in position 48b, recombination switch means 18' in position 18'a, and output clock switch means 49 in position 49a. This enables the loading of the next data section into second register 42 at the fixed rate (determined by input clock 44) while the original preceding data section is unloaded from first register 40 at the slightly higher rate (determined by output clock 46). Output clock 46 includes a dwell or blanking period which is activated before or after the unloading of each data section from first and second registers 40 and 42. This provides a "halt" or "pause" between each compressed data section in order to produce the appropriate data gaps. This procedure is repeated until the entire input data stream is sectioned, compressed and reconstructed into a gapped output data stream.

The compression and gap generation means 16a may include a code bit generator circuit 51, FIG. 4. The clock circuit signal on line 23 activates code bit generator circuit 51, which provides a definable sequence of coded bits and inserts this sequence of bits via lines 25 at the beginning and end of each data section in registers 40 and 42. Three or more pixels of each CCD, near the butt joint, are used to recognize these coded bits in order to identify the commencement and termination of each data section. Alternatively, one sequence of coded bits could be installed either before or after the data section to signify respectively the commencement or termination of each data section, and a clock means could be utilized to time the length of either the data sections or of the data gaps.

The high-speed clock rate is calculated by determining the number of pixel sites to be disregarded and calculating the ratio accordingly. For example, if eight pixel sites are to be disregarded at each junction (i.e., four pixel sites from each adjacent CCD), the ratio of the high-speed clock rate to that of the low-speed clock rate is 2,056/2048. In other words, the high-speed clock rate is faster than the low-speed clock rate by a factor of $(1 + 8/2048) = 1.004$). The data gap can be increased to accommodate the definable sequence of coded bits for data recognition by increasing the high-speed clock rate and dwell period accordingly.

Figure 5:
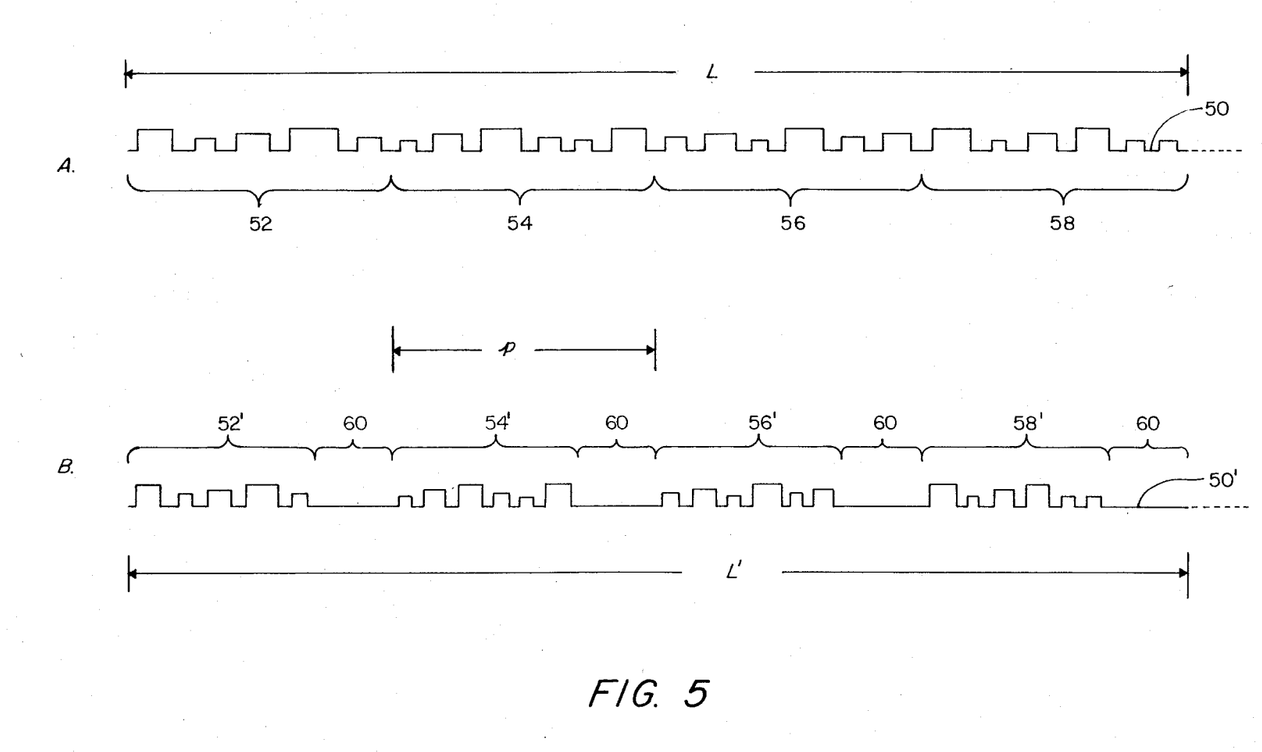
FIG. 5A is a representative diagram of an input data stream.
FIG. 5B is a representative diagram of the output data stream delivered by the data rate conversion circuit of this invention, depicting the compressed data sections and the gaps inserted in the data stream.

The representative streams of data 50 and 50' shown in FIG. 5A and FIG. 5B depict the data compression and inserted gaps provided by the data rate conversion circuit. Data stream 50, FIG. 5A, is representative of the input data stream that would be delivered by the reception means to the dividing means. Data stream 50', FIG. 5B, is representative of the gapped output data stream delivered by the data rate conversion circuit to the recorder means.

Data stream 50, FIG. 5A, of length L, is divided into n sections of p length, where L equals the overall length of the discontinuous reader device, n equals the number of continuous reader elements or components in the discontinuous reader device, and p equals the length of each continuous reader component or element. For example, if the discontinuous reader device is a butted CCD substrate containing four linear CCD arrays of 2,048 pixels each, the input data stream 50, FIG. 5A, is divided into four sections 52, 54, 56 and 58, each having a length equal to that of 2,048 pixel sites.

Each data section is compressed by the compression and gap generation means into a period shorter than that of the original data section as shown in FIG. 5B. Compressed data section 52', FIG. 5B, is identical to original data section 52, FIG. 5A, except for the fact that it is compressed and includes gap 60. This is true of each compressed data section 52'–58'. Each compressed data section 52'–58' includes a space or gap 60, which occupies the length of additional time created by the data compression (e.g., the period of eight pixel sites, four sites from each CCD adjacent to the joint). The entire gapped output data stream 50' is identical in length and content to the original input data stream 50. The only differentiation is that of the data compression and gap insertion. These gaps are deliberately aligned with the joints or nonconformities of a discontinuous reader device, thereby maintaining accurate data retention because the pixel sites at or near the butt joint are no longer required to detect or retain any data. The compression of data allows gap insertion while maintaining accurate data stream length, thereby enabling the reading of the data streams by conventional devices, at conventional rates.

The data compression and gap insertion can be adjusted to alleviate several additional pixel sites in order to receive a definable sequence of coded bits used to signify the start and finish of each data section. For example, a code bit generator could provide a series of "ones" at the beginning and end of each data section. While the last two or more pixels of each CCD at the butt joint of each CCD are not required to recognize or retain any information, the next several pixel sites can be used to recognize the "ones" inserted in the data sections as code bits. This can be utilized to signify the beginning and end of each data section. Alternatively, a "start-only" or "stop-only" series of code bits could be utilized with a clock means to determine either the length of each data section or that of the gap between each section.

Figure 6:
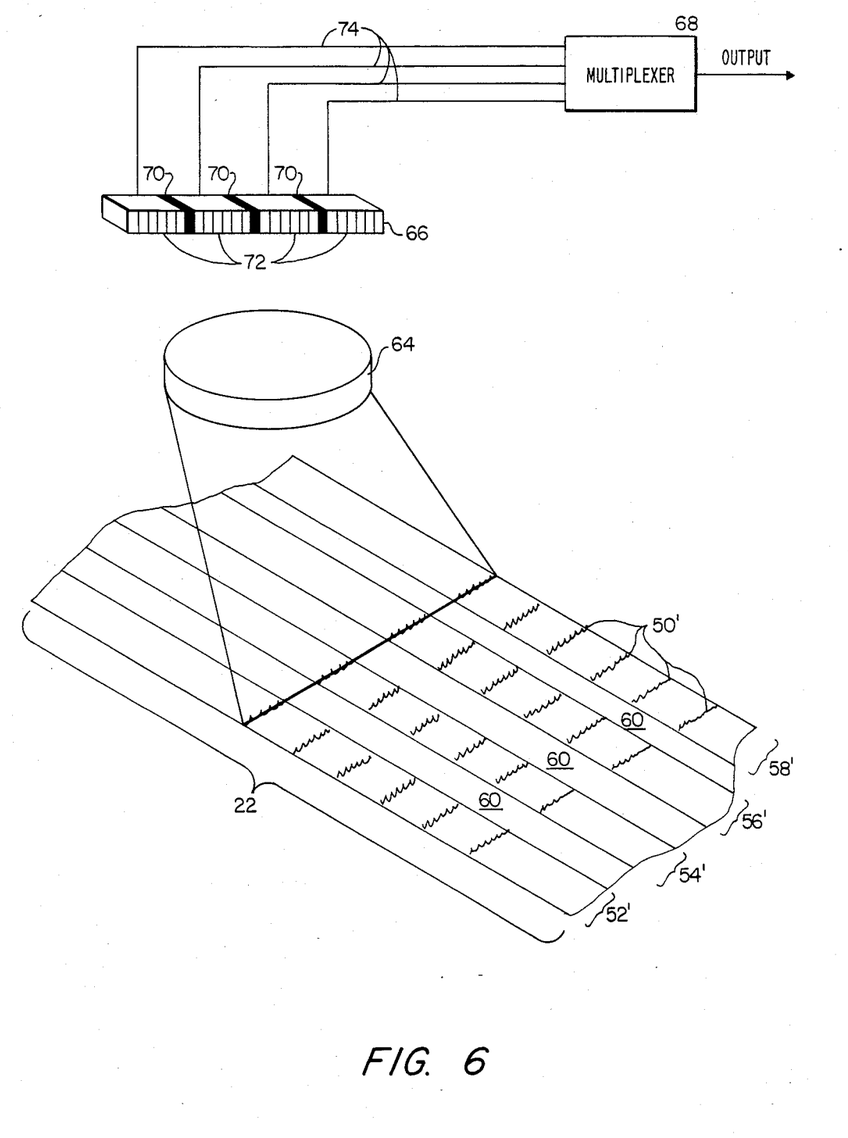
FIG. 6 is a simplified block diagram of the recording medium and a discontinuous reader device utilized by this invention.

The recording medium 22 and discontinuous reader device 66 are shown in FIG. 6. Each compressed gapped data stream 50' is recorded across recording medium 22. The recording medium 22 is drawn across the area viewed by the discontinuous reader device 66. Lens 64 focusses the data streams for reading by discontinuous reader device 66. The output of each continuous element or component 72 of discontinuous reader device 66 is delivered by leads 74 to multiplexer 68, for subsequent processing. The gaps 60 between data sections 52'–58' in data streams 50' are aligned with the joints or nonconformities 70 of discontinuous reader device 66. This effectively avoids any loss of data due to the inherent unreliability of the pixels adjacent to the joints of the discontinuous reader device. Although only three data gaps 60 are shown in FIG. 6, each data stream may include an arbitrarily large number of gaps, depending on the desired performance of the data processing system.

Figure 7:
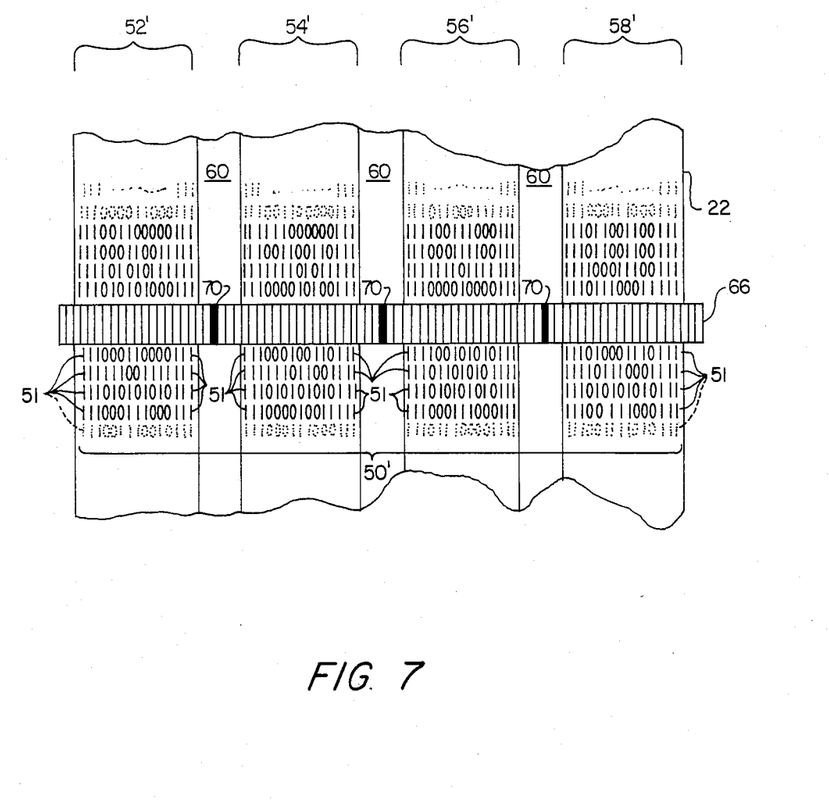
FIG. 7 is a more detailed drawing of the recording medium and the discontinuous reader device shown in FIG. 6, showing the coded bits utilized to identify the occurrence of the data sections.

A more detailed drawing of recording medium 22 and discontinuous reader device 66 is shown in FIG. 7. Discontinuous reader device 66 is shown schematically in FIG. 7 superimposed on the recording medium 22, thereby allowing the pixels to face the viewer for ease of understanding. The gapped output data streams 50' are recorded across recording medium 22. Each data stream 50' is divided into a number of compressed data sections 52'–58'. Each compressed data section is separated by an intermittent space or gap 60. Each gap 60 is deliberately aligned with the joint or nonconformity 70 of the discontinuous reader device 66. The gaps are wide enough to overlap two or more pixels on either side of the joint of the discontinuous reader device. This allows for four or more pixels which are not required to recognize or retain any informational data. Alternatively, the gaps could be wider to allow for additional pixel sites at each CCD joint in order to recognize coded bits used to identify the data sections. This can be accomplished by increasing the high speed clock rate and dwell period accordingly.

For example, the first and last bits 51 in each data section 52'-58' may be defined as single coded or special bits, which are statistically unlikely to repeat and which identify the commencement and termination of each data section. The compression of data can be increased to accommodate the additional code bits by increasing the output clock rate and dwell period accordingly. Those pixels on the reader device which correspond to the code bits are used to recognize the code bits in order to insure proper gap alignment and reliable data retention. Since the commencement and termination of each data section are identical from line to line (and are not likely to shift by more than a position of a pixel from line to line), one bit is adequate to define the commencement or termination of each data section. Typically, three pixel sites are necessary to recognize each code bit. A typical data gap, therefore should be equal to at least twelve pixel sites; six pixel sites to recognize the two code bits which define the start and stop of each data section, and six pixel sites (three on each adjacent CCD at each joint) to prevent the loss of data due to the inherent unreliability of those pixel sites that are adjacent to the junction of the CCDs. Alternately, the one-bit commencement or termination codes could be replaced by multi-bit start-stop codes to enhance the reliability of identifying the beginning and end of each data section.

In the preferred embodiment, a separate definable sequence of code bits is used to signify the beginning and end of each data section or data gap. Alternatively, a single definable sequence of code bits may be utilized for each data section to signify either the commencement or termination of that section, and a clock means may be used to determine either the length of the data section or that of the data gap, respectively.

The invention may also be accomplished by a method of reading optical data which includes receiving an input data stream to be recorded on a recording medium and dividing the input data stream into a series of data sections. Each data section in the series is compressed into a period shorter than the period of the original section and data gaps are provided between each compressed data section. The compressed data sections are recombined with the data gaps into a gapped output data stream and recorded on a recording medium. This may be accomplished by the system disclosed herein or other systems programmed according to this optical recording technique.

Other embodiments will occur to those skilled in the art and are within the following claims:

What is claimed is:

1. An optical data recording system comprising:
    reception means for receiving an input data stream to be recorded on a recording medium;
    means responsive to said reception means for dividing said input data stream into a series of data sections;
    means for compressing each said data section in said series into a period shorter than the period of the original section and for providing data gaps between each compressed data section;
    means for recombining said compressed data sections including said data gaps into a gapped output data stream; and
    means for recording said gapped output data stream on a recording medium.

2. The data recorder system of claim 1 in which said means for recording includes an optical recorder.

3. The data recorder system of claim 2 in which said optical recorder includes a laser.

4. The data recorder system of claim 1 in which said recording medium is adapted to be read by a discontinuous reader device.

5. The data recorder system of claim 1 in which said reception means includes a terminal for receiving said input data stream.

6. The data recorder system of claim 5 in which said reception means includes synchronizing means for operating said means for dividing, said means for compressing and said means for recombining to synchronously section, compress and recombine said input data stream.

7. The data recorder device of claim 6 in which said synchronizing means includes a synchronous detector responsive to said terminal.

8. The data recorder device of claim 7 in which said synchronizing means further includes clock means, responsive to said synchronous detector, for activating said means for dividing to initiate the sectioning, compression and reassembly of said input data stream.

9. The data recorder system of claim 3 in which said means for recording further includes a modulator device for controlling the laser output to said recording medium.

10. The data recorder system of claim 9 in which said means for recording further includes a deflector device, responsive to said laser output, for recording said gapped output data streams on said recording medium.

11. The data recorder system of claim 1 in which said means for dividing includes first and second register means and first register switching means for alternately loading each register with sections of the data stream.

12. The data recorder system of claim 11 in which said means for recombining includes second register switching means for alternately unloading each register to reform the data stream.

13. The data recorder system of claim 12 in which said means for compressing includes a first clock means having a first rate, and a second clock means having a second, higher clock rate than said first clock rate, and clock switching means for alternately interconnecting each of said clock means to each of said register means.

14. The data recording system of claim 13 in which said second clock means includes a dwell period for providing said input gaps.

15. The data recording system of claim 1 in which said gapped output data stream of data includes a plurality of coded bits for identifying said compressed data sections.

16. The data recording system of claim 15 in which there are two definable sequences of said coded bits associated with each data section to identify the commencement and termination of each said data section.

17. The data recording system of claim 15 in which there are two definable sequences of said coded bits associated with each data section to identify the commencement and termination of each said data gap.

18. The data recording system of claim 15 in which there is one definable sequence of said coded bits for each data section to identify the commencement of each said data section, and clock means to determine and identify the termination of each said data section.

19. The data recording system of claim 15 in which there is one definable sequence of said coded bits for each data section, to identify the commencement of each said data gap, and clock means to determine and identify the termination of each said data gap.

20. A method of optical data recording comprising:
receiving an input data stream to be recorded on a recording medium;
dividing said input data stream into a series of data sections;
compressing each said data section in said series into a period shorter than the period of the original section and providing data gaps between each compressed data section;
recombining said compressed data sections including said data gaps into a gapped output data stream; and
recording said gapped output data stream on a recording medium.

21. A data recorder system comprising:
means for recording data on a recording medium;
means for receiving a stream of data to be recorded on said recording medium; and
means for generating gaps in said data stream and delivering said gapped data stream to said means for recording including means for dividing said data stream into a series of sections, means for compressing the portion of the data stream in each section into a period shorter than that of the section, and means for recombining said compressed sections into a gapped data stream.

22. The data recorder system of claim 21 in which said means for recording includes an optical recorder.

23. The data recorder system of claim 21 in which said recording medium is adapted to be read by a discontinuous reader device.

24. The data recorder system of claim 21 in which said means for receiving includes a terminal for receiving said input data stream.

25. The data recorder system of claim 24 in which said means for receiving includes synchronizing means for operating said means for dividing, said means for compressing and said means for recombining to synchronously section, compress and recombine said input data stream.

26. The data recorder device of claim 25 in which said synchronizing means includes a synchronous detector responsive to said terminal.

27. The data recorder device of claim 26 in which said synchronizing means further includes clock means, responsive to said synchronous detector, for activating said means for dividing to initiate the sectioning, compression and reassembly of said input data stream.

28. The data recorder system of claim 21 in which said means for dividing includes first and second register means and first register switching means for alternately loading each register with sections of the data stream.

29. The data recorder system of claim 27 in which said means for recombining includes second register switching means for alternately unloading each register to reform the data stream.

30. The data recorder system of claim 28 in which said means for compressing includes a first clock means having a first rate, and a second clock means having a second, higher clock rate than said first clock rate, and clock switching means for alternately interconnecting each of said clock means to each of said register means.

31. The data recording system of claim 29 in which said second clock means includes a dwell period in addition to said second clock rate for providing said input gaps.

32. The data recording system of claim 20 in which said gapped output data stream of data includes a plurality of coded bits for identifying said data compressed data sections.

33. A data recorder system comprising:
means for recording data on a recording medium;
means for receiving a stream of data to be recorded on said recording medium; and
means for generating gaps in said data stream and delivering said gapped data stream to said means for recording including first and second register means and first register switching means for alternately loading one register and then the other with consecutive sections of the data stream for dividing said data stream into a series of sections; first clock means, second clock means having a higher clock rate than said first clock means, and clock switching means for alternately interconnecting each of said clock means to each of said register means, for compressing the portions of the data stream in each section into a period shorter than that of the section; and second register switching means for alternately unloading one register and then the other to reform the data stream.

34. A data recorder system for recording on a recording medium data to be read by a discontinous reader device, comprising:
means for recording data on a recording medium;
means for receiving a stream of data to be recorded on said recording medium; and
means for generating gaps corresponding to discontinuities in said reader device in said data stream and delivering said gapped data stream to said means for recording including means for dividing said data stream into a series of sections, means for compressing the portion of the data stream in each section into a period shorter than that of the section; means for recombining said compressed sections into a gapped data stream; and synchronizing means for synchronously operating said means for dividing, said means for compressing, and said means for recombining to align the gaps with the discontinuities of the reader device.

* * * * *